United States Patent Office 3,245,997
Patented Apr. 12, 1966

3,245,997
3-SUBSTITUTED 1-(1,2,3,4-TETRAHYDRO-2-ISOQUINOLYL) ALKYL-2-THIOUREAS
Peter Yonan, Chicago, Ill., assignor to G. D. Searle & Co., Chicago, Ill., a corporation of Delaware
No Drawing. Filed July 17, 1963, Ser. No. 295,795
3 Claims. (Cl. 260—288)

The present invention relates to a group of substituted thioureas which contain the tetrahydroisoquinolyl structure. More particularly, it relates to compounds of the following general formula

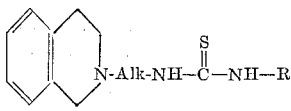

wherein Alk is a lower alkylene radical and R is selected from the group consisting of lower alkyl, cycloalkyl, lower alkenyl, phenyl, and benzyl.

The lower alkylene radicals referred to above contain up to 6 carbon atoms, and, preferably, they separate the nitrogen atoms attached thereto by at least 2 carbon atoms. Examples of such lower alkylene radicals are ethylene, trimethylene, tetramethylene, pentamethylene, and hexamethylene. The lower alkyl radicals referred to above contain up to 6 carbon atoms and are exemplified by radicals such as methyl, ethyl, propyl, butyl, and hexyl. The lower alkenyl radicals referred to above likewise contain up to 6 carbon atoms and are exemplified by allyl and crotyl.

Also encompassed by this invention are the non-toxic salts of the aforementioned organic bases, as exemplified by the hydrochloride, hydrobromide, hydroiodide, tartrate, succinate, malate, acetate, citrate, ascorbate, nitrate, sulfate, phosphate, and sulfamate.

The compounds of the present invention are prepared by reacting the appropriate isothiocyanate with a 2-aminoalkyl-1,2,3,4-tetrahydroisoquinoline. The reaction is carried out under anhydrous conditions in an inert solvent—a solvent which does not contain a hydroxy or an amino group. Anhydrous ether is a particularly useful solvent for the reaction.

The intermediate 2-aminoalkyl-1,2,3,4,-tetrahydroisoquinolines are conveniently prepared by reducing the appropriate 2-cyanoalkyl-1,2,3,4-tetrahydroisoquinoline. This reduction can be carried out either catalytically or chemically, and lithium aluminum hydride has been found to be particularly useful chemical reducing agent for this purpose.

The compounds of this invention possess valuable pharmacological properties. In particular, they are anti-inflammatory agents, and this effect is demonstrated by their phenylbutazone-like effect on edematous conditions. They also possess anti-hypertensive activity. In addition, they are anti-bacterial agents as is demonstrated by their inhibition of the growth of the organism *Diplococcus pneumoniae*, and they inhibit germination of seeds of trifolium.

The compounds which constitute this invention and their preparation will appear more fully from a consideration of the following examples which are given for the purpose of illustration only, and are not to be construed as limiting the invention in spirit or in scope. In these examples, quantities are indicated in parts by weight and temperatures in degrees centigrade (° C.).

Example 1

A solution of 133 parts of 1,2,3,4-tetrahydroisoquinoline in 200 parts of 2-butanone is added portionwise to a mixture of 75.5 parts of chloroacetonitrile and 69 parts of potassium carbonate in 200 parts of 2-butanone. The mixture is refluxed for four hours and then cooled and filtered. The filtrate is distilled to give 2-cyanomethyl-1,2,3,4-tetrahydroisoquinoline.

A mixture of 133 parts of 1,2,3,4-tetrahydroisoquinoline, 60 parts of acrylonitrile and 175 parts of dry toluene is heated on a steam bath for 7 hours and then allowed to stand at room tmperature for 15 hours. The solvent is removed under reduced pressure and the residue is distilled to give 2-(2-cyanoethyl)-1,2,3,4-tetrahydroisoquinoline boiling at about 195–205° C. at 10 mm. pressure.

Example 2

A solution of 93 parts of 2-(2-cyanoethyl) - 1,2,3,4-tetrahydroisoquinoline in 530 parts of anhydrous ether is added portionwise to a stirred mixture of 38 parts of lithium aluminum hydride in 1400 parts of anhydrous ether. The addition takes about 1.5 hours and the mixture is then refluxed for an additional 2.5 hours. The mixture is then cooled in an ice bath and excess lithium aluminum hydride is decomposed by the cautious dropwise addition of water. The reaction mixture is then filtered to remove the inorganic salts and the filtrate is dried and then distilled to give, after removal of the solvent, 2-(3-aminopropyl)-1,2,3,4-tetrahydroisoquinoline.

If an equivalent quantity of 2-cyanomethyl 1,2,3,4-tetrahydroisoquinoline is substituted for the 2-(2-cyanoethyl)-1,2,3,4-tetrahydroisoquinoline and the above reduction with lithium aluminum hydride is repeated, the product is 2-(2-aminoethyl)-1,2,3,4-tetrahydroisoquinoline.

Example 3

To a solution of 6 parts of 2-(3-aminopropyl)-1,2,3,4-tetrahydroisoquinoline in 35 parts of anhydrous ether is added portionwise, with stirring, a solution of 2.5 parts of methyl isothiocyanate in 15 parts of anhydrous ether. The product crystallizes from the reaction mixture when it is stirred. The product thus obtained is 1-[3-(1,2,3,4-tetrahydro-2-isoquinolyl)propyl]-3-methyl-2-thiourea and it melts at about 84–85° C. This compound has the following formula

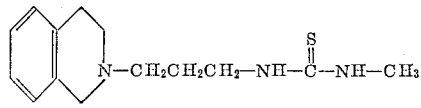

Example 4

5.5 parts of 2-(2-aminoethyl)-1,2,34-tetrahydroisoquinoline is reacted with 2.5 parts of methyl isothiocyanate according to the procedure described in Example 3. In this case, the product is 1-[2-(1,2,3,4-tetrahydro-2-isoquinolyl)ethyl]-3-methyl-2-thiourea and it has the following formula

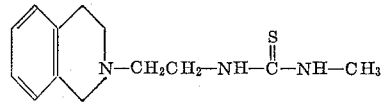

Example 5

To a solution of 7 parts of 2-(3-aminopropyl)-1,2,3,4-tetrahydroisoquinoline in 55 parts of anhydrous ether is added portionwise, with stirring, a solution of 4.5 parts of ethyl isothiocyanate in 20 parts of ether. The solvent is removed under reduced pressure and the residue is dissolved in ethanol. A solution of excess hydrogen chloride in 2-propanol is added to the ethanol solution. This is followed by the addition of ether which caused the hydrochloride to precipitate. The salt is separated and recrystallized from a mixture of ethanol and ether to give 1 - [3 - (1,2,3,4-tetrahydro-2-isoquinolyl)propyl]-3- ethyl-2-thiourea hydrochloride melting at about 180–181° C.

Example 6

An equivalent quantity of cyclohexyl isothiocyanate is substituted for the methyl isothiocyanate and the procedure of Example 3 is repeated. In this case, the product is 1-[3-(1,2,3,4-tetrahydro-2-isoquinolyl)propyl]-3-cyclohexyl-2-thiourea melting at about 135.5–136° C.

Example 7

If an equivalent quantity of phenyl isothiocyanate is used in place of the methyl isothiocyanate and the procedure of Example 3 is repeated, the product is 1-[3-(1,2,3,4 - tetrahydro - 2 - isoquinolyl)propyl]-3-phenyl-2-thiourea melting at abou 141–142° C. This compound has the following formula

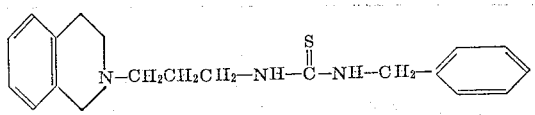

Example 8

An equivalent quantity of benzyl isothiocyanate is substituted for the methyl isothiocyanate and the reaction with 2 - (3 - aminopropyl)-1,2,3,4-tetrahydroisoquinoline described in Example 3 is repeated. The product is 1-[3-(1,2,3,4 - tetrahydro - 2 - isoquinolyl)propyl]-3-benzyl-2-thiourea and it has the following formula

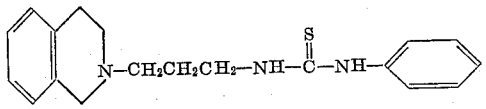

What is claimed is:
1. 1 - [3 - (1,2,3,4 - tetrahydro-2-isoquinolyl)-propyl]-3-phenyl-2-thiourea.
2. 1 - [3 - (1,2,3,4 - tetrahydro-2-isoquinolyl)-propyl]-3-cyclohexyl-2-thiourea.
3. 1 - [3 - (1,2,3,4-tetrahydro-2-isoquinolyl)propyl]-3-benzyl-2-thiourea.

References Cited by the Examiner
UNITED STATES PATENTS

| | | | |
|---|---|---|---|
| 3,006,913 | 10/1961 | Mull | 260—239 |
| 3,055,883 | 9/1962 | Mull | 260—288 |

HENRY R. JILES, *Acting Primary Examiner.*

DON M. KERR, DONALD G. DAUS,
*Assistant Examiners.*